Oct. 12, 1971  V. I. MOROZOV ET AL  3,611,489
DISK EXTRUDER FOR PROCESSING PLASTICS
Filed May 6, 1969

United States Patent Office 3,611,489
Patented Oct. 12, 1971

3,611,489
DISK EXTRUDER FOR PROCESSING PLASTICS
Vladimir Ivanovich Morozov, Gorkovskoi oblasti, ulitsa Pirogova 34, kv. 13; Viktor Fedorovich Prygunov, Gorkovskoi oblasti, ulitsa Tereshkovoi 4, kv. 47; and Viktor Mikhailovich Khanov, Gorkovskoi, oblasti, ulitsa Pirogova 34, kv. 18, all of Dzerzhinsk, U.S.S.R.
Filed May 6, 1969, Ser. No. 822,276
Int. Cl. B29f *3/03*
U.S. Cl. 18—12 R                4 Claims

ABSTRACT OF THE DISCLOSURE

An extruder for processing plastic in which a fixed disk having a feed throat is provided with a centrally disposed outlet for processed materials and a rotating disk located within the fixed disk coacts therewith to define an inner cavity. The fixed disk is formed with at least one through-hole communicating with the inner cavity and through which gaseous substances evolved from the material undergoing processing are discharged.

BACKGROUND OF THE INVENTION

This invention relates to means for processing plastics and, more particularly to disk extruders for processing plastics, particularly thermoplastics, which evolve gaseous substances during processing.

A disk extruder is known for processing thermoplastics which comprises a stationary disk provided with a feed hopper and an orifice disposed centrally therein for constituting an outlet for the processed material, a rotating disk accommodated within the stationary disk, and a mechanism for adjusting the gap between the stationary disk and the rotating disk.

The known disk extruder operates as follows. A powdered or granular material is charged into the feed hopper after which it flows into a gradually contracting gap between the stationary and the fixed disks, and undergoes therein a melting due to frictional heat. The material is displaced towards the center of the rotating disk under the effect of normal forces, and emerges through the orifice in the stationary disk center.

However, in the known disk extruder the gaseous substances evolved while the material undergoes melting, leave the inner cavity of the extruder via the feed hopper so that the ascending gaseous stream entrains therewith the particles of the powdered material being charged into the extruder which cause clogging of the feed hopper and loss of the material. Moreover, the clogging of the feed hopper results in periodic bursts of the gaseous substances through the feed hopper, which affect adversely the extruder operation insofar as the gas bursts expel the feed stock from the hopper.

SUMMARY OF THE INVENTION

It is an object of the present invention to eliminate the aforementioned disadvantages.

It is further a more specific object of the present invention to provide a disk extruder which will make it possible to process plastics evolving significant amounts of gaseous substances while being processed and to ensure unhindered outlet of the evolved gases from the inner cavity of the disk extruder.

More particularly, the above and other objects are accomplished by a disk extruder comprising a fixed disk having a feed throat and a processed material outlet, and a rotating disk disposed inside of the fixed disk, with the fixed disk being provided with at least one through-hole communicating with the inner cavity of the extruder and serving for discharging gaseous substances evolved from the material being processed.

It is expedient to provide through-holes for discharging the gaseous substances ahead of the feed throat in the direction of rotation of the rotating disk with the through-holes being inclined in a direction opposite to the disk rotation to avoid losses of the material being processed and equipped with means such as gates or baffles for controlling the cross-sectional area thereof.

The present invention is illustrated hereinbelow by the description of an exemplary embodiment thereof to be taken in conjunction with the accompanying drawings, wherein:

Figure 1:
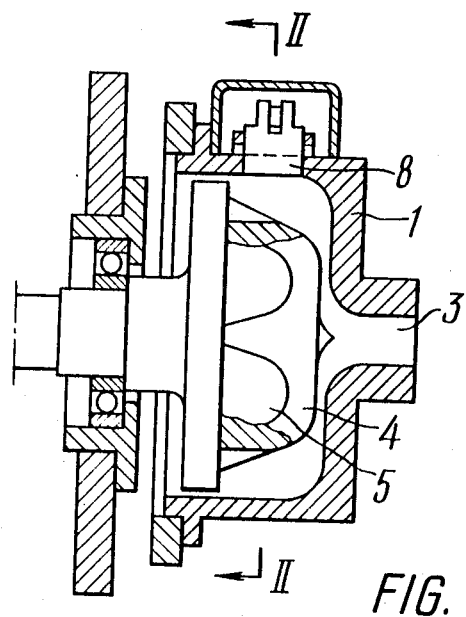
FIG. 1 is a longitudinal sectional view of the disk extruder, according to the invention.
Figure 2:
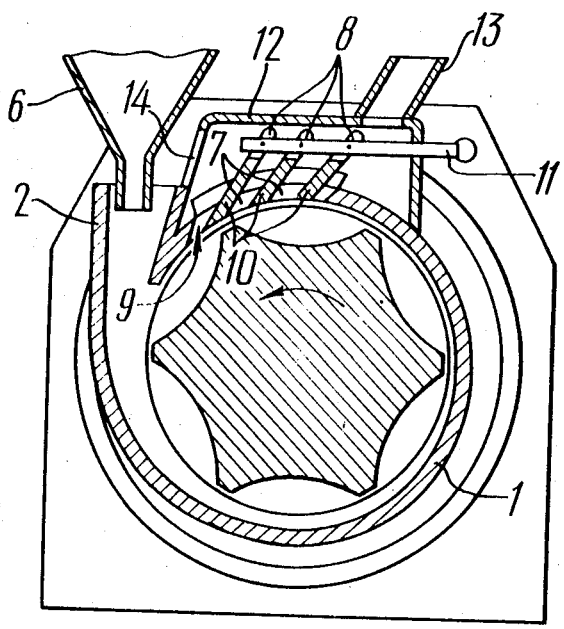
FIG. 2 is a sectional view taken along line II—II of FIG. 1, the view looking in the direction of the arows.

The present disk extruder incorporates a fixed disk 1 (FIG. 1) provided with a tangentially disposed feed throat 2 (FIG. 2) and having a central outlet orifice 3 for processed material, and a rotating disk 4 having ribs 5 on the outer surface thereof in order to attain a superior degree of mixing of the material being processed. A hopper 6 is mounted above the feed throat 2 (FIG. 2) and is furnished with a batcher (not shown in the drawings). In the fixed disk 1 are a plurality of through-holes 7, which communicate with the inner cavity of the disk extruder, i.e. with the space defined by the fixed disk 1 and rotating disk 4. The holes 7 are formed by plates 8 inserted into a port 9 (FIG. 2) in the fixed disk 1. The plates 8 are inclined in a direction opposite to the direction of rotation of the disk 4 and are movable about shafts 10 and hinged to a tie rod 11. To close the holes 7, there is provides a hood 12 having an exhaust connection 13 and a port 14 for air intake.

The disk extruder of the invention operates as follows:

A powdered or granular material is delivered from the hopper 6 into the feed throat 2, and thence to a gradually contracting gap constituted by the inner surface of the fixed disk 1 and the outer surface of the rotating disk 4.

In the gap, the material being processed undergoes heating, melts and travels towards the center of the rotating disk 4 under the effect of normal forces, so that the material that enters the outlet orifice 3 consists of a homogenized melt. Gaseous substances evolved from the material being processed into the free space of the inner cavity and also the air are expelled through the holes 7 and the exhaust connection 13. The plastic material being processed also tends to leave the extruder via the holes 7, but impinges against the inclined wall of the hole 7 and is thrown back into the extruder inner cavity.

In order to control the rate of travel of the gaseous substances leaving the extruder, the cross-sectional area of the holes 7 can be varied by tilting the plates 8 via the tie bar 11. During the start-up period, the holes 7 should be closed completely by the plates 8 to avoid losses of the plastic material, which is not yet melted, and also prevent the space inside the hood 12 and exhaust connector 13 from beign clogged with the nonmolten mass of the material. The port 14 in hood 12 allows air to seep into the extruder, thereby making the flow of air through the feed throat 2 less vigorous, since otherwise a rapid air stream would have entrained the material being processed through the hole 7.

The present disk extruder makes it possible to process, without undue losses, plastics, such as polymethylmethacrylate or polyvinylchloride which evolve, during processing, significant quantities or gaseous substances, with an effective discharge of the gaseous substances in

We claim:

1. An extruder for processing plastics comprising a fixed disk having a feed throat and a processed material outlet orifice disposed centrally therein, a rotating disk disposed inside said fixed disk and cooperable therewith to define an inner cavity, and said fixed disk having at least one through-hole adjacent said feed throat communicating the inner cavity with the atmosphere serving to discharge gaseous substances evolved from the material being processed.

2. The extruder according to claim 1, wherein the holes for discharging the gaseous substances are disposed ahead of the feed throat in the direction of rotation of the rotating disk.

3. The extruder according to claim 1, including means for varying the cross-sectional area of holes for discharging gaseous substances.

4. An extruder for processing plastics comprising a fixed disk having a feed throat and a processed material outlet orifice disposed centrally therein, a rotating disk disposed inside said fixed disk and cooperable therewith to define an inner cavity, and said fixed disk having at least one through-hole communicating with the inner cavity serving to discharge gaseous substances evolved from the material being processed, the holes for discharging the gaseous substances being inclined in a direction opposite to the direction of rotation of the rotating disk for avoiding lossess of processed material.

References Cited

UNITED STATES PATENTS

| | | | |
|---|---|---|---|
| 3,026,565 | 3/1962 | Bonner | 18—12 |
| 3,362,044 | 1/1968 | Irving | 18—12 |
| 3,367,635 | 2/1968 | Gresch | 18—12 |
| 3,350,742 | 11/1967 | Wood | 18—12 |

JAMES M. MEISTER, Primary Examiner